(12) United States Patent
Song et al.

(10) Patent No.: US 9,830,006 B2
(45) Date of Patent: Nov. 28, 2017

(54) HANDWRITTEN TYPE ELECTRONIC PAPER DISPLAY AND MANUFACTURING METHOD THEREOF

(75) Inventors: Danna Song, Beijing (CN); Zhuo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 212 days.

(21) Appl. No.: 13/700,085

(22) PCT Filed: Aug. 2, 2012

(86) PCT No.: PCT/CN2012/079581
§ 371 (c)(1),
(2), (4) Date: Nov. 26, 2012

(87) PCT Pub. No.: WO2013/017095
PCT Pub. Date: Feb. 7, 2013

(65) Prior Publication Data
US 2013/0127760 A1 May 23, 2013

(30) Foreign Application Priority Data
Aug. 3, 2011 (CN) .......................... 2011 1 0221598

(51) Int. Cl.
*G06F 3/0354* (2013.01)
*G06F 3/041* (2006.01)
*G02F 1/167* (2006.01)

(52) U.S. Cl.
CPC ............ *G06F 3/0412* (2013.01); *G02F 1/167* (2013.01); *G06F 3/03545* (2013.01); *G06F 2203/04103* (2013.01)

(58) Field of Classification Search
CPC ............ G06F 3/03545; G06F 3/03546; G06F 3/03547; G06F 3/041
(Continued)

(56) References Cited

U.S. PATENT DOCUMENTS 6,222,513 B1 * 4/2001 Howard et al. ................. 345/84
2004/0113884 A1 6/2004 Albert et al.
(Continued)

FOREIGN PATENT DOCUMENTS

CN 101650508 A 2/2010
CN 101907811 A 12/2010
(Continued)

OTHER PUBLICATIONS

Chinese First Office Action dated Aug. 12, 2013; Appln. No. 2011102215983.
(Continued)

*Primary Examiner* — Amare Mengistu
*Assistant Examiner* — Cory Almeida
(74) *Attorney, Agent, or Firm* — Ladas & Parry LLP

(57) ABSTRACT

Embodiments of the invention provide a handwritten type electronic paper display and a manufacture method thereof. The handwritten type electronic paper display comprises: a first electrode substrate (1) and a second electrode substrate (2) having a same pixel electrode matrix structure, an electronic paper thin film (3), a flexible printed circuit (4), a stylus (5) and an electrical source. The electronic paper thin film (3) is bonded onto an upper surface of the first electrode substrate (1), a common electrode of the electronic paper thin film is electrically connected to a negative electrode of the electrical source; the second electrode substrate (2) is fixed on the electronic paper thin film (3) in a thin film manner; the flexible printed circuit (4) is adapted for electrically connecting pixels of the first electrode substrate (1) to corresponding pixels of the second electrode substrate (2); and the stylus (5) is electrically connect to a positive electrode of the electrical source.

12 Claims, 2 Drawing Sheets

(58) Field of Classification Search
USPC .............................. 345/179; 178/18.01–20.04
See application file for complete search history.

(56) References Cited

U.S. PATENT DOCUMENTS

| | | | |
|---|---|---|---|
| 2006/0274055 A1* | 12/2006 | Reynolds | H03K 17/962 345/174 |
| 2008/0030667 A1* | 2/2008 | Lee | G02F 1/13452 349/150 |
| 2008/0186259 A1 | 8/2008 | Todorokihara et al. | |
| 2010/0066391 A1* | 3/2010 | Hirasaka et al. | 324/686 |

FOREIGN PATENT DOCUMENTS

| | | |
|---|---|---|
| EP | 0942405 A2 | 9/1999 |
| JP | 5486980 | 5/1978 |
| JP | 11316397 A | 11/1999 |
| JP | 2002-014379 A | 1/2002 |
| JP | 2002014379 A | 1/2002 |
| JP | 2005-115307 A | 4/2005 |

OTHER PUBLICATIONS

International Preliminary Report on Patentability dated Feb. 4, 2014; PCT/CN2012/079581.
International Search Report dated Aug. 11, 2012; PCT/CN2012/079581.
Korean Notice of Allowance Appln. No. 10-2012-7030814; dated Oct. 23, 2014.
Extended European Search Report Appln. No. 12787347.9-1507/2741136 PCT/CN2012079551; dated Feb. 16, 2015.
Japanese Notice of Allowance dated Sep. 16, 2016; Appl. No. 2014-523189.

* cited by examiner

HANDWRITTEN TYPE ELECTRONIC PAPER DISPLAY AND MANUFACTURING METHOD THEREOF

CROSS REFERENCE TO RELATED APPLICATIONS

This application is a national stage application under 35 U.S.C. 371 and claims the benefit of PCT Application No. PCT/CN2012/079581 having an international filing date of Aug. 12, 2012, which designated the United States, which PCT application claimed the benefit of Chinese Application No. 201110221598.3 filed Aug. 3, 2011, the disclosure of both the above-identified applications are incorporated herein by reference.

TECHNICAL FIELD

Embodiments of the present invention relate to a handwritten type electronic paper display and a manufacturing method thereof.

BACKGROUND

An electronic paper display is a display device which drives "electronic ink" encapsulated within "microcapsules" for display by an electric field. Electronic ink is a kind of liquid by itself, and can be printed or coated on a surface of a carrier. Electronic ink is formed by suspending both very fine black and white particulates in a transparent liquid. Microcapsule technique is to encapsulate electronic ink in the microcapsules so as to solve the problem of conglomeration of pigment particles.

The particulates contained within the electronic ink are charged, in which the white particulates are positively charged and black particulates are negatively charged. Microcapsules are sandwiched between a transparent electrode plate on the upper side and a bottom electrode plate on the lower side. When a negative voltage is applied on the upper transparent electrode plate, the positively charged white particulates will be attracted to the transparent electrode plate under the effect of the electric field and aggregate there, which makes the transparent electrode plate display white; meanwhile, the negatively charged black particulates are repelled to the bottom electrode plate to hide there under the effect of the electric field formed. When a positive voltage is applied on the upper transparent electrode plate, the movement directions of the black particulates and white particulates are reversed so as to display black at the transparent electrode plate. This is the basic principle of the black-white electronic paper display.

In an electronic paper display, there are mainly two ways for controlling the movement of the black and white particulates. In an electronic paper recording device, the electronic paper is powered by and communicated with an electromagnetic induction unit. When a handwritten input operation is performed on the electronic paper with an electronic stylus, the coordinate of the position of the stylus is detected, and then the vector data corresponding to the coordinate track is sent to the electronic paper as display data for display. In another electronic paper display, a touch screen and a drive circuit are provided. The position being touched on the touch screen is detected by the drive circuit to drive the electronic paper display to display correspondingly.

In summary, the existing electronic paper display achieves the display control of the electronic paper by electromagnetic induction or by complex circuit processing, which gives rise to a complex structure and high costs, wastes electrical energy, and cannot meet the development requirements such as energy saving and environment protection for an electronic paper display.

SUMMARY

One of the technical problems to be solved by the embodiments of the invention is to provide a handwritten type electronic paper display with a simple structure, low costs and energy saving, and a manufacturing method thereof.

One embodiment of the invention provides a handwritten type electronic paper display comprising a first electrode substrate and a second electrode substrate, which have a same pixel electrode matrix structure, an electronic paper thin film, a flexible printed circuit, a stylus and an electric source, wherein the electronic paper thin film is bonded onto an upper surface of the first electrode substrate, a common electrode of the electronic paper thin film and a negative electrode of the electrical source are electrically connect; the second electrode substrate is fixed on the electronic paper thin film in a thin film manner and opposite to the first electrode substrate, therefore the electronic paper thin film is sandwiched therebetween; the flexible printed circuit is adapted for connecting pixels of the first electrode substrate and corresponding pixels of the second electrode substrate electrically; and the stylus is electrically connected to a positive electrode of the electrical source.

For example, the handwritten type electronic paper display further comprises a reversing switch connected between the common electrode of the electronic paper thin film and the negative electrode of the electrical source, for resetting the electronic paper thin film.

For example, the flexible printed circuit comprises FPC pins, top wirings, bottom wirings and metal terminals. The FPC pins are arranged at the both end of the flexible printed circuit for connecting the first electrode substrate and the second electrode substrate respectively; the top wirings is adapted for electrically connecting the pixels of the first electrode substrate and the corresponding pixels of the second electrode substrate through the FPC pins; and the bottom wirings are adapted for leading all wirings connected between the pixels of the first electrode substrate and the corresponding pixels of the second electrode substrate to the metal terminals.

For example, the handwritten type electronic paper display further comprises a switch provided on the metal terminals for applying a voltage, which is supplied by the electrical source, needed for erasing the displayed image.

For example, the electrical source is a battery which is provided along with the electronic paper thin film.

Another embodiment of the invention also provides a manufacturing method of the handwritten type electronic paper display comprising:

Step A, providing a first electrode substrate and a second electrode substrate;

Step B, bonding an electronic paper thin film on an upper surface of the first electrode substrate, and connect a common electrode of the electronic paper thin film to a negative electrode of an electrical source;

Step C, fixing the second electrode substrate on the electronic paper thin film in a thin film manner so as to be opposite to the first electrode substrate;

Step D, electrically connecting pixels of the first electrode substrate and corresponding pixels of the second electrode substrate with a flexible printed circuit; and Step E, electrically connecting a stylus to a positive electrode of the electrical source.

For example, the manufacturing method further comprises: step F, connecting a reversing switch between the common electrode of the electronic paper thin film and the negative electrode of the electrical source.

For example, the flexible printed circuit comprises FPC pins, top wirings, bottom wirings and metal terminals, while the step D comprises: electrically connecting the pixels of the first electrode substrate and the corresponding pixels of the second electrode substrate through the FPC pins arranged at the both ends of the flexible printed circuit with the top wirings, and leading all wirings connected between the pixels of the first electrode substrate and the corresponding pixels of the second electrode substrate to the metal terminals with the bottom wirings.

For example, the manufacturing method further comprises: step G, providing a switch connected to the metal terminals for applying a voltage needed for erasing a displayed image.

For example, providing the first electrode substrate in the step A comprises:

Step A11, depositing a conducting layer on a glass substrate to form pixel electrode wirings by patterning;

Step A12, depositing a layer of conducting material to form a pixel electrode pattern by patterning;

Step A13, depositing an insulating layer to form an insulating layer pattern by patterning, and exposing a bonding area of the flexible printed circuit at an edge of the glass substrate.

For example, providing the second electrode substrate in the step A comprises:

Step A21, depositing a conducting layer on a glass substrate to pattern to form pixel electrode wirings;

Step A22, depositing a layer of transparent conducting materials to form a pixel electrode pattern by patterning; and Step A23, depositing an insulating layer to form an insulating layer pattern by patterning, and exposing the bonding area of the flexible printed circuit at the edge of the glass substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

1: first electrode substrate; 2: second electrode substrate; 3: electronic paper thin film; 4: flexible printed circuit; 5: stylus; 6: reversing switch; 7: electrical source; 10: electronic paper display; 41: FPC pins; 42: top wirings; 43: bottom wirings; 44: connecting fingers.

DETAILED DESCRIPTION

The implementation of the invention will be further explained in detail hereinafter in connection with the drawings and embodiments. The following embodiments are illustrative, but not to limit the scope of the invention.

Figure 1:
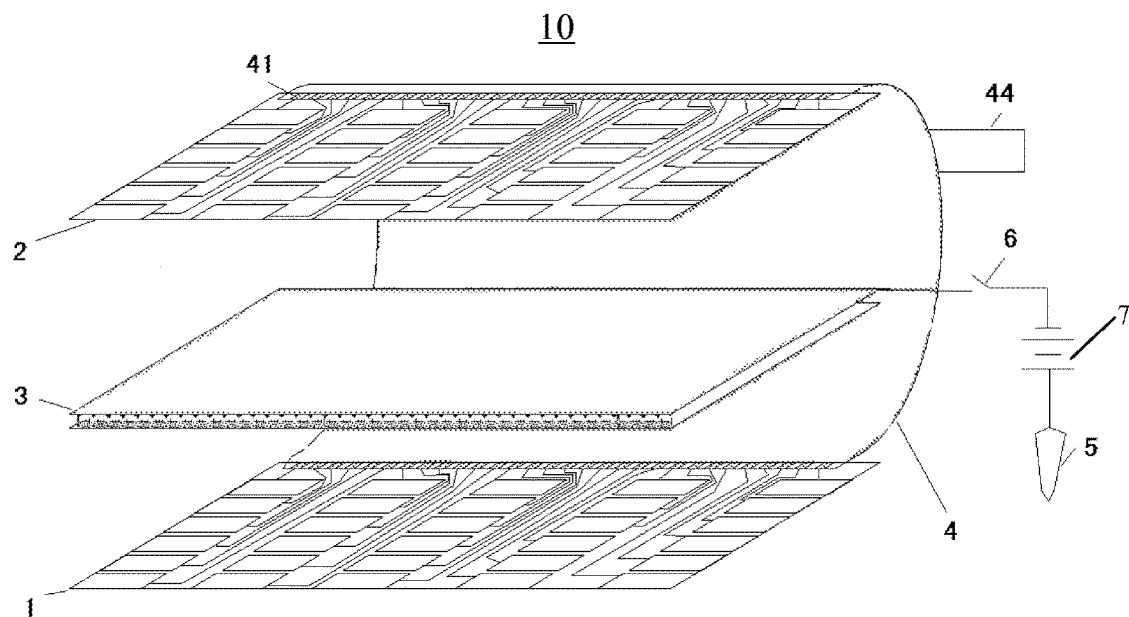
FIG. 1 is a schematic structure view of a handwritten type electronic paper display of an embodiment of the invention.

As shown in FIG. 1, a handwritten type electronic paper display 10 of an embodiment of the invention comprises a first electrode substrate 1 and a second electrode substrate 2 which have a same pixel electrode matrix structure, an electronic paper thin film 3, a flexible printed circuit (FPC) 4, a stylus 5 and a battery 7 acting as an electrical source.

The electronic paper thin film 3 is bonded onto an upper surface of the first electrode substrate 1, and a common electrode of the electronic paper film 3 is connected with a negative electrode of the electrical source. The electronic paper thin film 3, for example, comprises electronic ink encapsulated within a plurality of microcapsules and a transparent common electrode (not shown) provided above the layer of the microcapsules. These microcapsules, for example, are provided to correspond to respective pixels of the display. The first electrode substrate 1 acts as a bottom electrode plate of the electronic paper display 10, pixel electrodes of which are provided to correspond to respective pixels of the display 10, for cooperating with the transparent common electrode of the electronic paper thin film 3 to drive the electronic ink in the microcapsules to realize display. The electronic ink may comprise black and white particulates to realize black and white display, or may comprise color particulates to realize color display.

The second electrode substrate 2 is fixed on the electronic paper thin film 3 in a thin film manner, opposite to the first electrode substrate 1. The pixels of the second electrode substrate 2 are correspondingly connected to the pixels of first electrode substrate 1. Furthermore, when the first electrode substrate 1, the electronic paper thin film 3 and the second electrode substrate 2 are formed into a sandwiched structure, the pixels on the first electrode substrate 1 and the second electrode substrate 2, which are connected electrically to each other, are also overlapped each other in a thickness direction of the display 10.

The flexible printed circuit 4 is respectively connected to a side of the first electrode substrate 1 and the second electrode substrate 2 for electrically connecting the pixels of the first electrode substrate 1 and the corresponding pixels of the second electrode substrate 2. To achieve such a connection, the first electrode substrate 1 and the second electrode substrate 2 further comprise wirings which are connected to respective pixel electrodes, and these wirings are further led to the side of respective substrates at the peripheral portion around the display area to form an pad area for connecting the pad area of the flexible printed circuit 4.

The stylus 5 is connected to a positive electrode of the electrical source. The stylus 5 may be achieved in any suitable manner for applying voltages.

The electronic paper display of this embodiment of the invention uses a control manner of matrix driving. Namely, a number of pixel electrodes constituting a matrix are provided on the bottom electrode plate (the first electrode substrate 1) of the electronic paper display, an transparent common electrode is provided on the electronic paper thin film opposite to the bottom electrode plate, and different voltages are applied on these pixel electrodes to form an electric field respectively with the common electrode to control each pixel so as to, for example, display white or black.

In this embodiment of the invention, another electrode substrate (the second electrode substrate 2), which is the same as the bottom electrode plate (the first electrode substrate 1) of the electronic paper display screen, is provided for the electronic paper display screen, and then the above two substrates are connected by the FPC, thus the pixel electrodes of the electronic paper display screen are led outside the bottom electrode plate. In operation, voltages can be applied to respective pixel electrodes on the second electrode substrate 2 by a stylus, i.e., it is possible to apply voltages to the pixels of the bottom electrode plate of the electronic paper display screen so as to achieve the function of handwriting. The electronic paper display screen of this embodiment has a simple structure, without a touch screen and ICs providing position signals and other ICs for driving according to the position signals.

Further, this handwritten type electronic paper display may further comprise a reversing switch 6 connected between the common electrode of the electronic paper thin film 3 and the negative electrode of the electrical source, for restoring (resetting) the electronic paper thin film 3. Therefore, this embodiment restores the electronic paper thin film 3 with the reversing switch 6, thus can repeatedly erase the handwritten type electronic paper display, and furthermore the handwritten type electronic paper display may be written or drawn randomly.

Figure 2:
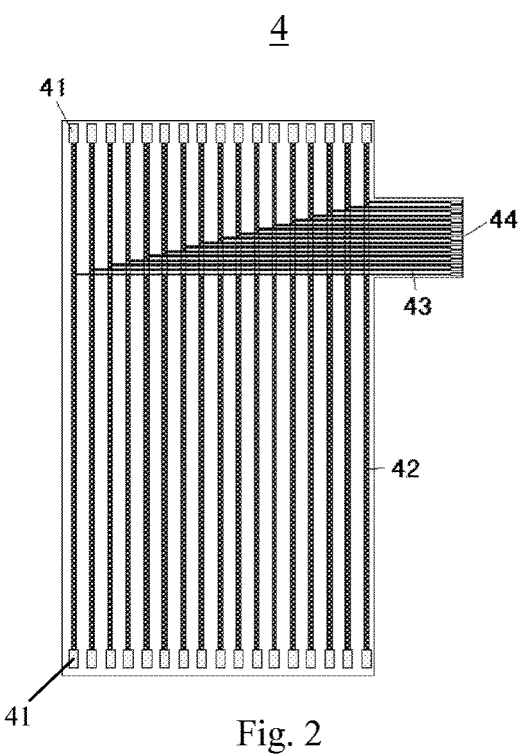
FIG. 2 is a schematic structure view of the flexible printed circuit of an embodiment of the invention.

As shown in FIG. 2, one example of the flexible printed circuit 4 comprises FPC pins 41, top wirings 42, bottom wirings 43 and metal terminals of the circuit board, for example, gold fingers 44.

The FPC pins 41 are arranged at the both ends of the flexible printed circuit 4 to form pad area at the both ends of the flexible printed circuit 4, for connecting to the first electrode substrate and the second electrode substrate, respectively.

The top wirings 42 are connected to the pins 41 at the both ends of the flexible printed circuit 4, for connecting the respective pixels of first electrode substrate 1 to the corresponding pixels of the second electrode substrate 2 through the FPC pins. The bottom wirings 43 are split or branched from the top wirings 42 correspondingly, for leading all wirings connected between the respective pixels of the first electrode substrate 1 and the corresponding pixels of the second electrode substrate 2 onto the gold fingers 44.

In addition, a negative voltage capable of erasing the image may be applied on the gold fingers 44 for resetting the electronic paper thin film.

In another embodiment, the handwritten type electronic paper display may further comprise an button provided on the metal terminals (for example, the gold fingers 44), and this button is connected to the metal terminals, for applying the voltage, which is provided by the electrical source, needed for erasing the displayed image. In this way, the electronic paper thin film may be restored as long as the button is pressed once. Switches in other manner than a button may be used, such as toggle switch or photoelectric switch, or it may be controlled by operation interface on the display.

The electrical source may be a battery which is provided along with the electronic paper thin film 3, for example, a lithium battery, a lithium ion battery, a Ni-MH battery, an alkaline battery and the like. The electrical source may also be an electrical source externally.

An internal electrical source (for example, a battery) is used such that there is no need to add a peripheral circuit, which simplifies the integral structure.

Corresponding to the handwritten type electronic paper display described above, an embodiment of the invention further provides a manufacturing method of the handwritten type electronic paper display.

Figure 3:
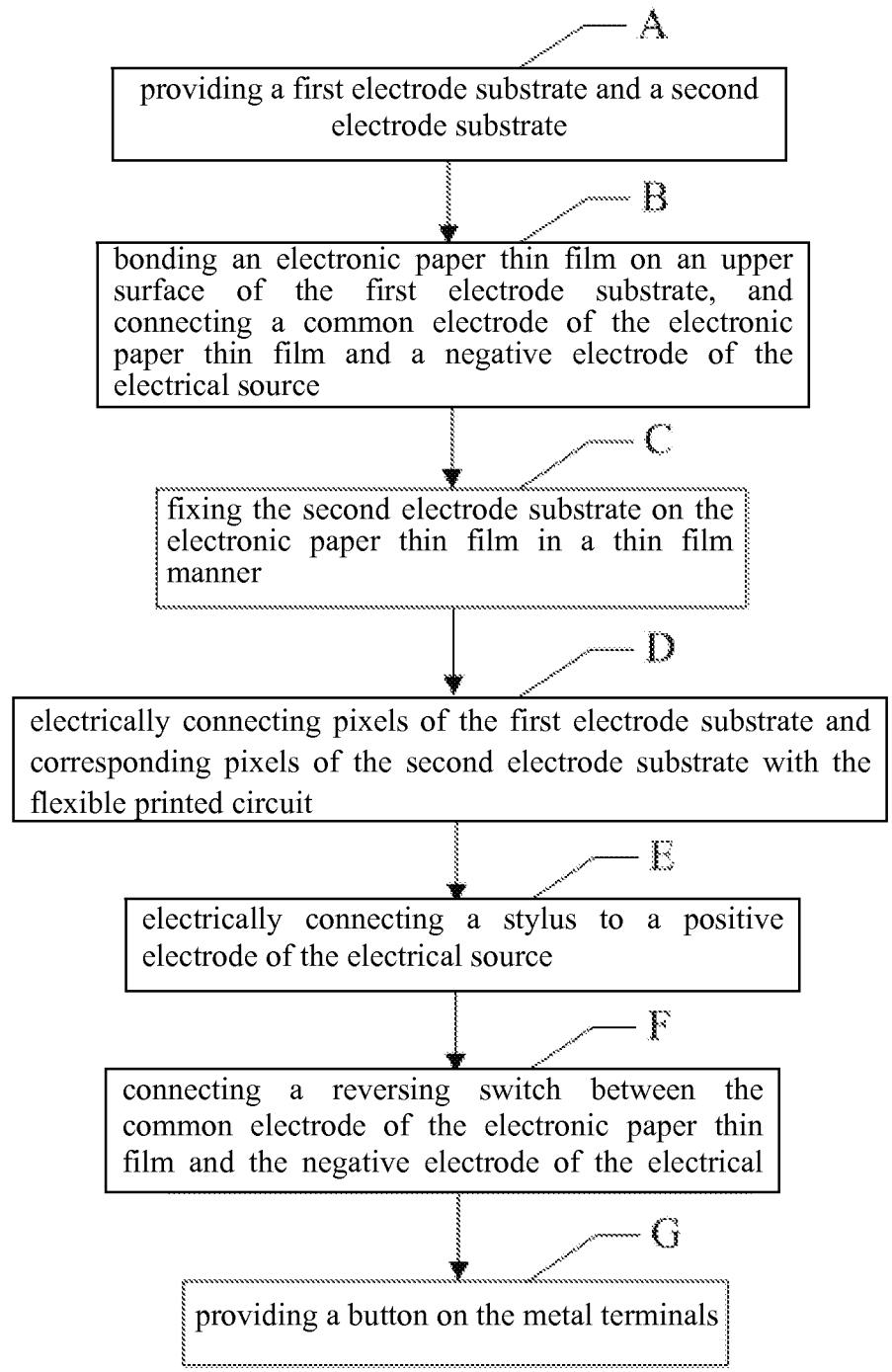
FIG. 3 is a flowchart of a manufacturing method of the handwritten type electronic paper display of an embodiment of the invention.

As shown in FIG. 3, the manufacturing method of a handwritten type electronic paper display described in the embodiment of the invention comprises the following steps.

Step A, providing a first electrode substrate and a second electrode substrate.

In one example of the step A, providing the first electrode substrate or the second electrode substrate comprises:

Step A1, depositing a conducting layer, for example a metal layer, on for example a glass substrate by a sputter to form pixel electrode wirings;

Step A2, depositing a layer of transparent conducting material (for example ITO) by a sputter to form a transparent electrode, and then forming a pixel electrode pattern by patterning;

Step A3, further depositing an insulating layer by, for example, plasma enhanced chemical vapor deposition (PECVD), and forming a pattern of the insulating layer by patterning, and exposing a flexible printed circuit bonding area at an edge of the glass substrate to obtain the first electrode substrate or the second electrode substrate.

As to the first electrode substrate, another non-transparent conducting material (for example a metal) may also be adapted for the step A2 to form the pixel electrodes.

The second electrode substrate may be obtained by repeating the steps A1-A3 described above. In one example, in the step A3, the pixel electrodes may be exposed together with patterning the insulating layer to form the bonding area; or, in another example, the insulating layer described above may not be included on the second electrode substrate so that the pixel electrode is exposed directly for facilitating to applying voltages by a stylus.

Step B, bonding an electronic paper thin film onto an upper surface of the first electrode substrate and connecting a common electrode of the electronic paper thin film to a negative electrode of an electrical source.

Step C, fixing the second electrode substrate on the electronic paper thin film in a thin film manner, opposite to the first electrode substrate.

Step D, electrically connecting pixels of the first electrode substrate and corresponding pixels of the second electrode substrate with the flexible printed circuit.

Step E, electrically connecting a stylus to a positive electrode of the electrical source.

When the first electrode substrate, the electronic paper thin film and the second electrode substrate form a sandwiched structure, the pixels on the first electrode substrate and the pixels on the second electrode substrate, which are connected to each other, are overlapped in a thickness direction.

In one example, as shown in FIG. 2, an FPC 4 electrically connects the pixels of the first electrode substrate and the corresponding pixels of the second electrode substrate with top wirings 42 through FPC pins 41 on its both ends, and leads all wirings connected between the pixels of the first electrode substrate and the corresponding pixels of the second electrode substrate to metal terminals, for example gold fingers 44, of the circuit board with bottom wirings 43.

The FPC 4 electrically connects the pixels of first electrode substrate and the corresponding pixels of the second electrode substrate together. Applying of voltages between the second electrode substrate and the common electrode of electronic paper thin film with the stylus is equal to applying of voltages between the first electrode substrate and the common electrode of electronic paper thin film. In this way, voltages can occur between the two electrodes of the electronic paper thin film, the particulates in the electronic paper thin film will move under the effect of the electric field, for example the black and white state of the respective pixels of the electronic paper thin film change, and the external light enters into human eyes due to the reflection of the electronic paper thin film after passing through the transparent upper glass to form a image.

Further, the manufacturing method of the handwritten type electronic paper display of the embodiment of the invention may further comprise:

Step F, connecting a reversing switch between the common electrode of the electronic paper thin film and the negative electrode of the electrical source for restoring (resetting) the electronic paper thin film.

If the image is intended to be erased, the voltage of the electronic paper thin film may be reversed with the reversing switch to generate the voltage needed for erasing the image, and then a reversing voltage is applied at the gold fingers of the FPC to erase the image.

Further, the manufacturing method of the handwritten type electronic paper display of the embodiment of the invention may further comprise:

Step G, providing a button on the metal terminals, a side of which contacting the metal terminals carries the voltage needed for erasing the image.

As such, the electronic paper thin film may be reset as long as the button is pressed once. Switches of other manner than a button may be used.

The order of the combination of above steps may be according to the order of the alphabet.

In summary, the embodiment of the invention discloses a handwritten type electronic paper display and a manufacturing method thereof. According to the above embodiments of the invention, by providing another electrode substrate (a second electrode substrate), which is the same as a bottom electrode plate (first electrode substrate) of the electronic paper display screen, for the electronic paper display, connecting the above two substrates with an FPC and connecting the pixels corresponding to each other of the first and the second electrode substrates, accordingly the pixel electrodes of electronic paper display screen are led outside of the bottom electrode plate. By means of applying a voltage to the pixel electrodes of the second electrode substrate by a stylus, it is possible to apply a voltage to the corresponding pixels of the first electrode substrate acting as the bottom electrode plate of electronic paper display screen, thereby to display and achieve an electronic paper display screen with function of handwriting. This electronic paper display screen has a simple structure and low costs, saves energy, and needs not any touch screen and ICs to provide the position signals and any other ICs for driving according to the position signals. Furthermore, the handwritten type electronic paper display of the embodiment of the invention can be erased repeatedly and furthermore can be written and drawn randomly.

The embodiment of the invention being thus described, it will be obvious that the same may be varied in many ways. Such variations should not be regarded as a departure from the spirit and scope of the invention, and all such modifications as will be obvious to those skilled in the art are intended to be included within the scope of the following claims.

The invention claimed is:

1. A handwritten type electronic paper display comprising:
   a first electrode substrate and a second electrode substrate, an electronic paper thin film, a flexible printed circuit, a stylus and an electrical source; wherein
   the first electrode substrate comprises first pixel electrode and the second electrode substrate comprises second pixel electrodes, and the first pixel electrodes and the second pixel electrodes have a same pixel electrode matrix structure;
   the electronic paper thin film is bonded onto an upper surface of the first electrode substrate, and a common electrode of the electronic paper thin film is electrically connected to a negative electrode of the electrical source for creating an electric field between the respective first pixel electrodes of the first electrode substrate and the common electrode to drive electronic ink in microcapsules of the electronic paper thin film to realize display;
   the second electrode substrate is fixed on the electronic paper thin film in a thin film manner, opposite to the first electrode substrate, and therefore the electronic paper thin film is sandwiched therebetween;
   the flexible printed circuit is adapted for electrically connecting the first pixel electrodes of the first electrode substrate to corresponding second pixel electrodes of the second electrode substrate, the flexible printed circuit comprising wrings that electrically connect the first pixel electrodes to the corresponding second pixel electrodes; and
   the stylus is electrically connected to a positive electrode of the electrical source,
   wherein a voltage is applied to the second pixel electrodes of the second electrode substrate by the stylus in an input operation, and the voltage applied by the stylus to the second pixel electrodes of the second electrode substrate is transferred from the second pixel electrodes though the wirings of the flexible printed circuit board to corresponding first pixel electrodes of the first electrode substrate such that the electric field is formed between the respective first pixel electrodes, which receive the voltage transferred from the second electrodes, and the common electrode to drive the electronic ink in the microcapsules of the electronic paper thin film to achieve a function of handwriting.

2. The handwritten type electronic paper display according to claim 1 further comprising:
   a reversing switch connected between the common electrode of the electronic paper thin film and the negative electrode of the electrical source for resetting the electronic paper thin film.

3. The handwritten type electronic paper display according to claim 1, wherein the flexible printed circuit comprises the wirings, FPC pins and metal terminals, and the wirings comprise too wirings and bottom wirings, wherein
   the FPC pins are arranged at both ends of the flexible printed circuit for connecting the first electrode substrate and the second electrode substrate respectively;
   the top wirings is adapted for electrically connecting the pixels of the first electrode substrate and the corresponding pixels of the second electrode substrate through the FPC pins; and
   the bottom wirings are adapted for leading all wirings connected between the pixels of the first electrode substrate and the corresponding pixels of the second electrode substrate to the metal terminals.

4. The handwritten type electronic paper display according to claim 3 further comprising:
   a switch connected to the metal terminals for applying a voltage, which is supplied by the electrical source and needed for erasing a displayed image.

5. The handwritten type electronic paper display according to claim 4, wherein the switch is a button, a toggle switch or a photoelectric switch.

6. The handwritten type electronic paper display according to claim 1, wherein the electrical source is a battery which is provided along with the electronic paper thin film.

7. A manufacturing method of handwritten type electronic paper display comprising:
 step A, providing a first electrode substrate and a second electrode substrate, the first electrode substrate comprising first pixel electrodes and the second electrode substrate comprising second pixel electrodes, and the first pixel electrodes and the second pixel electrodes have a same pixel electrode matrix structure;
 step B, bonding an electronic paper thin film on an upper surface of the first electrode substrate, and connecting a common electrode of the electronic paper thin film and a negative electrode of the electrical source for creating an electric field between the respective first pixel electrodes of the first electrode substrate and the common electrode to drive electronic ink microcapsules of the electronic paper thin film to realize display;
 step C, fixing the second electrode substrate on the electronic paper thin film in a thin film manner so as to be opposite to the first electrode substrate;
 step D, electrically connect the first pixel electrodes of the first electrode substrate to corresponding second pixel electrodes of the second electrode substrate with a flexible printed circuit, the flexible printed circuit comprising wirings the electrically connect the first pixel electrodes to the corresponding second pixel electrodes; and
 step E, electrically connect a stylus to an electrical source positive electrode, such that a voltage applied to the second pixel electrodes of the second electrode substrate by the stylus in an input operation is transferred from the second pixel electrodes through the wirings of the flexible printed circuit board to corresponding first pixel electrodes of the first electrode substrate such that the electric field is formed between the respective first pixel electrodes, which receive the voltage transferred from the second electrodes, and the common electrodes to drive the electronic ink in the microcapsules of the electronic paper thin film to achieve a function of handwriting.

8. The manufacturing method according to claim 7, further comprising:
 step F, connecting a reversing switch between the common electrode of the electronic paper thin film and the negative electrode of the electrical source.

9. The manufacturing method according to claim 7, wherein the flexible printed circuit comprises the wirings, FPC pins and metal terminals, and the wirings comprise top wirings and bottom wirings;
 the step D comprises:
 electrically connecting the pixels of the first electrode substrate and the corresponding pixels of the second electrode substrate through the FPC pins arranged at both ends of the flexible printed circuit with the top wirings, and
 leading all wirings connected between the pixels of the first electrode substrate and the corresponding pixels of the second electrode substrate to the metal terminals with the bottom wirings.

10. The manufacturing method according to claim 9 further comprising:
 step G, providing a switch connected to the metal terminals for applying a voltage needed for erasing a displayed image.

11. The manufacturing method according to claim 7, wherein providing the first electrode substrate in the step A comprises:
 step A11, depositing a conducting layer on a glass substrate to form pixel electrode wirings by patterning;
 step A12, depositing a layer of conducting material to form a pixel electrode pattern by patterning; and
 step A13, depositing an insulating layer to form an insulating layer pattern by patterning, and exposing a bonding area of the flexible printed circuit at an edge of the glass substrate.

12. The manufacturing method according to claim 7, wherein providing the second electrode substrate in step A comprises:
 step A21, depositing a conducting layer on a glass substrate to form pixel electrode wirings by patterning;
 step A22, depositing a layer of transparent conducting materials to form a pixel electrode pattern by patterning; and
 step A23, depositing an insulating layer to form an insulating layer pattern by patterning, and exposing a bonding area of the flexible printed circuit at an edge of the glass substrate.

* * * * *